United States Patent
Lodde et al.

(10) Patent No.: US 10,858,546 B2
(45) Date of Patent: Dec. 8, 2020

(54) CABLE WRAPPING TAPE

(71) Applicant: Coroplast Fritz Müller GmbH & Co. KG, Wuppertal (DE)

(72) Inventors: Christoph Lodde, Holzwickede (DE); Gülay Wittig, Bochum (DE)

(73) Assignee: Coroplast Fritz Müller GmbH & Co. KG, Wuppertal (DE)

( * ) Notice: Subject to any disclaimer, the term of this patent is extended or adjusted under 35 U.S.C. 154(b) by 252 days.

(21) Appl. No.: 14/509,824

(22) Filed: Oct. 8, 2014

(65) Prior Publication Data

US 2015/0024646 A1    Jan. 22, 2015

Related U.S. Application Data

(63) Continuation-in-part of application No. 14/309,311, filed on Jun. 19, 2014, now abandoned.

(30) Foreign Application Priority Data

Jul. 8, 2013 (DE) .......................... 10 2013 107 157

(51) Int. Cl.
| | |
|---|---|
| *C09J 7/00* | (2018.01) |
| *C09J 7/21* | (2018.01) |
| *D03D 1/00* | (2006.01) |
| *D03D 15/00* | (2006.01) |
| *D03D 13/00* | (2006.01) |
| *D03D 3/00* | (2006.01) |

(52) U.S. Cl.
CPC .................. *C09J 7/21* (2018.01); *D03D 1/00* (2013.01); *D03D 3/005* (2013.01); *D03D 13/008* (2013.01); *D03D 15/0033* (2013.01); *D03D 15/0094* (2013.01); *C09J 2203/302* (2013.01); *C09J 2421/00* (2013.01); *C09J 2433/00* (2013.01); *C09J 2467/006* (2013.01); *D10B 2331/04* (2013.01); *D10B 2505/02* (2013.01); *Y10T 442/2008* (2015.04)

(58) Field of Classification Search
CPC ...................... C09J 2203/302; Y10T 442/2008
USPC ................................................... 442/149, 60
See application file for complete search history.

(56) References Cited

U.S. PATENT DOCUMENTS

| | | |
|---|---|---|
| 2010/0291820 A1 | 11/2010 | Mayan |
| 2011/0226529 A1* | 9/2011 | Wittig .......................... C09J 7/04 174/71 R |

FOREIGN PATENT DOCUMENTS

| | | |
|---|---|---|
| DE | 202010003210 U1 | 12/2011 |
| EP | 0052363 B1 | 5/1984 |
| EP | 0635591 A1 | 1/1995 |

(Continued)

OTHER PUBLICATIONS

Machine translation of EP 2050802.*

(Continued)

*Primary Examiner* — Vincent Tatesure
(74) *Attorney, Agent, or Firm* — Dickinson Wright PLLC

(57) ABSTRACT

The present disclosure relates to a cable wrapping tape, including a band-shaped support (1) made of a textile fabric with warp threads (2) and weft threads (3) made of a PET plastic. The warp and weft threads (2, 3) are made of filament yarns, the size of the weft threads (3) being larger than the size of the warp threads (2). An adhesive coating is applied to the support (1). The size of the warp threads (2) is larger than/equal to 20 dtex and smaller than/equal to 40 dtex.

4 Claims, 1 Drawing Sheet

(56) References Cited

FOREIGN PATENT DOCUMENTS

| EP | 1074595 | A1 |   | 2/2001  |
|----|---------|----|---|---------|
| EP | 1990393 | B1 | * | 3/2008  |
| EP | 1990393 | A1 |   | 11/2008 |
| EP | 2050802 | A1 |   | 4/2009  |
| EP | 2050802 | B1 | * | 5/2010  |
| EP | 2298845 | A1 |   | 3/2011  |
| EP | 2322385 | A1 |   | 5/2011  |
| EP | 2520629 | A1 |   | 11/2012 |

OTHER PUBLICATIONS

Machine translation of EP 1990393.*
EP2050802 machine translation. translation date: Mar. 25, 2019, publication date: Apr. 22, 2009 (Year: 2009).*
Fung, Walter et al., "Textiles in Automotive Engineering," Published by Woodhead Publishing Limited in association with The Textile Institute, Cambridge, England, ISBN 1 85573 493 1, and Technomic Publishing Company, Inc., Lancaster Pennsylvania, ISBN 1-58716-080-3, 2001, 12 pages.

* cited by examiner

CABLE WRAPPING TAPE

CROSS-REFERENCE TO RELATED APPLICATIONS

This application is a Continuation-in-Part of U.S. application Ser. No. 14/309,311, filed on Jun. 19, 2014, and claims priority to German Patent Application 10 2013 107 157.0, filed on Jul. 8, 2013, the content of which is hereby incorporated by reference in its entirety.

TECHNICAL FIELD OF THE INVENTION

The present invention relates to a cable wrapping tape, comprising a band-shaped support made of a textile fabric consisting of warp threads and weft threads made of PET plastic, the warp and weft threads being made of filament yarns, and wherein the size of the weft threads is larger than the size of the warp threads, as well as of an adhesive coating applied to the support.

BACKGROUND OF THE INVENTION

A hand-tearable adhesive tape is known from EP 107 45 95, where the structure of the support fabric consists of thin warp threads and thick weft threads, the sum of the warp threads having a maximum size of 2,500 dtex per cm, and in addition the warp threads are fixed in their position by applying the adhesive coating thereto. The warp threads should have a size between 40 and 60 dtex, and the size of the weft threads should be selected between 150 and 250 dtex.

An adhesive tape is known from EP 199 03 93 A1 which has a band-shaped support consisting of warp and weft threads, the warp threads having a size of 50 dtex and more.

Owing to the selected thread sizes, these known adhesive tapes are relatively stiff so that it is difficult to wrap cables therewith, in particular in the case of tight bends. Furthermore, these known adhesive tapes likewise have a relatively large band thickness due to the selected thread size, and as a result, firstly the costs of the materials are high, and secondly additional weight is added to the finished and wrapped cable sets.

SUMMARY OF THE INVENTION

The underlying object of the present invention is to avoid the disadvantages mentioned above and to improve an adhesive tape of the type described at the beginning, so that firstly it is pliant and flexible, and secondly has lower manufacturing costs owing to the smaller band thickness, and in addition, so that it can be applied both manually and automatically.

According to the present invention, this object is attained on the basis of the cable wrapping tape described above, in that the size of the warp threads is larger than/equal to 20 dtex and smaller than/equal to 40 dtex.

In this context it is an advantage if the thread count per cm is larger than/equal to 20 and smaller than/equal to 35 per cm, where, in particular, the count of filament yarns per warp thread can be 24. Owing to the selected material, a very good temperature stability between 125° C. and 150° C. results, and the adhesive tape according to the present invention can be applied manually as well as automatically because the unwrapping forces are low, and also the elongation at break as well as the tear strength of the adhesive tape according to the present invention allow for a manual as well as automatic application. In addition, the adhesive tape according to the present invention also meets the requirements of LV312 as regards transverse tearability.

Further advantageous embodiments of the invention are contained in the subclaims, and the invention will be described in more detail on the basis of the exemplary embodiment provided in the attached drawings.

DETAILED DESCRIPTION OF THE DRAWINGS

Figure 1:
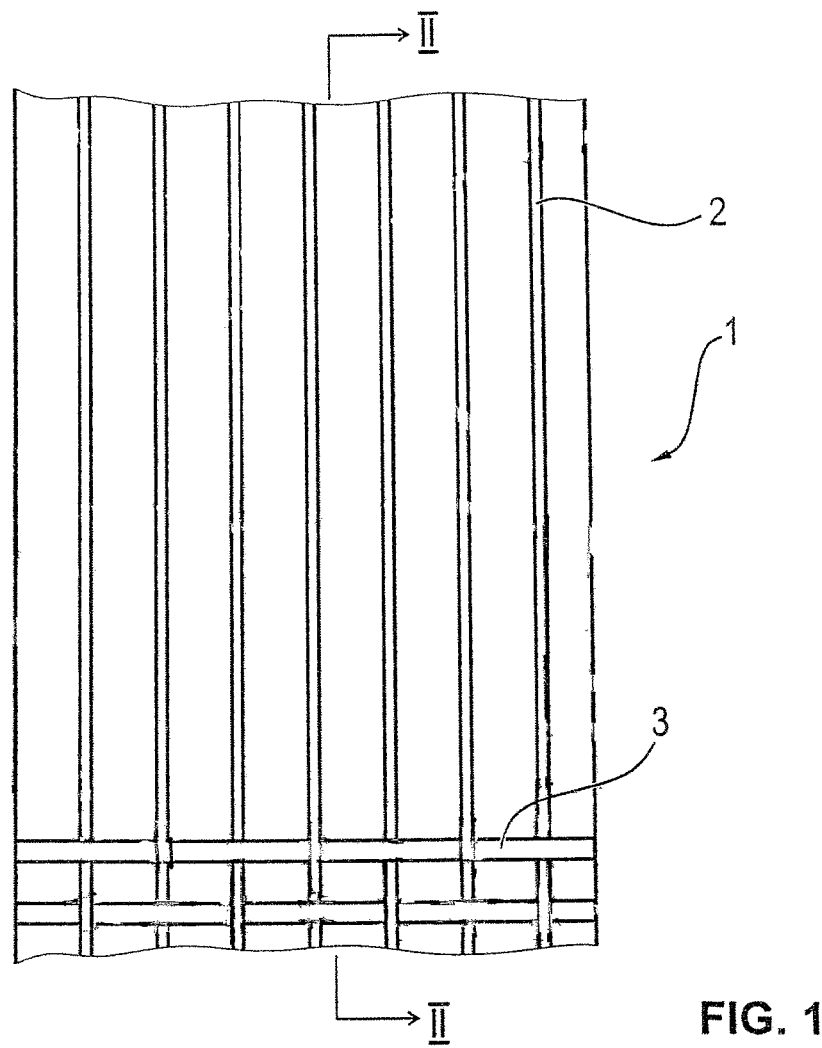
FIG. 1 shows a top view of an adhesive tape according to the present invention and FIG. 2 shows a cross section along II-II in FIG. 1.
Figure 2:
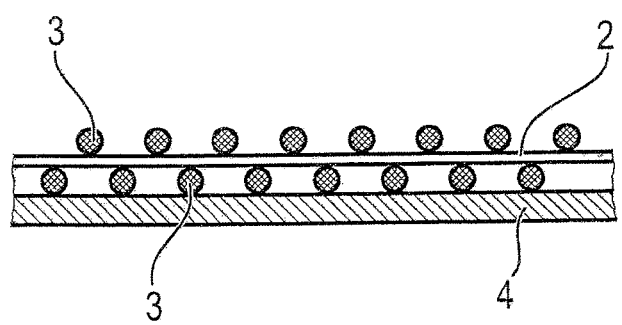

As is apparent from FIG. 1, a cable wrapping tape according to the present invention consists of a band-shaped support 1 made of a textile fabric, which is formed by warp threads 2 and weft threads 3. The material of the warp threads 2 and of the weft threads 3 is a PET plastic, wherein polyester is particularly preferred. The warp and weft threads 2, 3 are made of filament yarns. Filament yarns theoretically consist of threads having an infinite length, the so-called filaments. As a rule, filament yarns are not twisted, that is, the filaments are basically parallel to one another because they also stay together without twisting. A distinction is made between monofilaments, where only one fiber, that is one filament, forms the thread, and multifilaments, which consist of more than two individual fibers. Filament yarns of the following qualities are available on the market:

1. POY Thread

So-called pre-oriented yarns which are pre-oriented filament yarns, made of a thermoplastic material like polyester or polyamide which was spun at high speed and partially drawn.

2. FDY Thread (Fully Drawn Thread)

A smooth, thermoplastic filament yarn which is fully drawn and wound between two godets after having been spun and cooled by an air jet in the cooling duct.

3. DTY Yarn (DTY, Draw-Textured Yarns)

Draw-textured threads, which are mostly manufactured by false twist draw texturing with integrated drawing.

An adhesive coating 4 made preferentially of an acrylate adhesive or synthetic rubber is applied to one side of the support 1, its underside in the shown example. It is fundamental to the invention that the size of the warp threads 2 is larger than/equal to 20 dtex and smaller than/equal to 40 dtex, the size of the weft threads 3 being smaller than the size of the warp threads 2. In this case, it is particularly advantageous if the count of the warp threads 2 is smaller than/equal to 20 per cm and smaller than/equal to 30 per cm. Advantageously, the filament count, that is, the count of fibers per warp thread 2 is 24 to 96 filaments, preferentially 34 to 36 filaments. It is also conceivable that the count of warp threads 2 and weft threads 3 have a filament count of 36, 48 and 96 filaments. Furthermore, it is an advantage according to the present invention, if the count of weft threads 3 is smaller than/equal to 28 per cm and smaller than/equal to 40 per cm. It is also an advantage if the size of the weft threads 3 is between 155 dtex and 200 dtex, preferentially 167 dtex. The support fabric advantageously has weft threads 3, which have from 24 to 96 filaments per weft thread 3, preferentially 36 filaments (fibers). It is a further advantage if the grammage of the support 1 is larger than/equal to 40 g/m² and smaller than/equal to 120 g/m², in particular the grammage of the support 1 can be larger than/equal to 80 g/m² and smaller than/equal to 100 g/m². Furthermore, it is advantageous according to the present invention, if the warp threads 2 and/or the weft threads 3 are intermingled and/or texturized. It can also be provided according to the present invention, that the warp threads 2 and/or the weft threads 3 are spun dyed. In this context, spin dyeing is to be understood such that the threads are dyed during the extrusion process of the filaments that form the threads. Advantageous embodiments of an adhesive tape according to the present invention are shown in Table 1 below.

Table 2 provides an overview of the mechanical properties of the individual embodiments according to Table 1. Table 3 includes technical data of the adhesive tape according to the present invention as per Table 1 compared to prior art adhesive tapes.

TABLE 2

Support Material Constructions 1 to 3 Without Adhesive coating

| Test | Unit | Construction 1 | Construction 2 | Construction 3 | Patent EP 1074595 | Patent EP 1990393 A1 |
|---|---|---|---|---|---|---|
| Support material without adhesive coating | | polyester | polyester | polyester | polyester | polyester |
| Grammage | g/m² | 40-70 | 70-100 | 70-100 | 65-70 | 70-75 |
| Thickness | mm | 0.10 | 0.10 | 0.08 | 0.10 | 0.12 |
| Elongation at break | % | 8-10 | 8-20 | 8-20 | 23-30 | 25-28 |
| Breaking force | N/cm | 60-70 | 50-60 | 40-55 | 60-70 | 65-85 |
| Air permeability | l/m²s | 60-100 | 80-200 | 100-300 | 60-200 | 60-200 |
| Tear resistance | mN | 5,000-8,000 | 4,000-7,000 | 2,500-6,000 | 6,000-9,000 | 9,000-13,000 |

TABLE 1

Support Material Without Adhesive coating

| | Unit | Construction 1 | Construction 2 | Construction 3 |
|---|---|---|---|---|
| Support material without adhesive coating | — | Polyester | Polyester | Polyester |
| Grammage | g/m² | 40-70 | 70-100 | 70-100 |
| Type of fiber | — | 100% polyester | 100% polyester | 100% polyester |
| Type of yarn Warp threads/weft threads | — | Filament intermingled/ textured and spun dyed | Filament intermingled/ textured and spun dyed | Filament intermingled/ textured and spun dyed |
| Count of warp threads | 1/cm | 20 | 30 | 30 |
| Filament count warp threads | unit | 24 | 24 | 24 |
| Size of the warp threads | dtex | 40 | 33 | 20 |
| Count of weft threads | 1/cm | 30 | 35 | 35 |
| Size of the weft threads | dtex | 167 | 167 | 167 |
| Filament count warp [sic, weft] threads | unit | 36 | 36 | 36 |

TABLE 3

This Table Refers to the Coated Adhesive Tape

| Test | Unit | Constructions 1-3 | Patent EP 1074595 | Patent EP 1990393 |
|---|---|---|---|---|
| Thickness | mm | 0.08-0.12 | 0.15 | 0.15 |
| Elongation at break | % | 10-20 | 28-35 | 20-30 |
| Tear resistance | N/cm | 40-80 | 60-70 | 65-85 |
| Adhesive force steel | N/cm | 2.0-5.5 | 4.0-5.0 | 4.0-8.0 |
| Adhesive strength tape back | N/cm | 2.0-6.0 | 2.0-3.0 | 2.0-6.0 |
| Unwind adhesion | N | 2-9 | 2-9 | 2-9 |
| Flagging (30 min.) | mm | 0-1 | 0-1 | 0-1 |
| Flagging (24 h) | mm | 0-1 | 0-1 | 0-1 |
| Abrasion 5 mm-mandrel | strokes | 20-75 (Class A) | 35-70 (Class A) | 130-150 (Class B) |
| Noise damping | dB (A) | 1-1.5 (Class A) | 1-1.6 (Class A) | 1-1.6 (Class A) |
| Hand tearability as per LV312 | ./. | Transversely tearable | Transversely tearable | Transversely tearable |

An adhesive tape according to the present invention is characterized by a very good temperature stability according to LV 312 within a range of 105° C. to 150° C., can be processed manually or mechanically, has a low strip thickness, is pliant and flexible, and consists of a rot resistant backing. By using the embodiment according to the present invention, it is possible to dispense with finishing steps, such as dressing or rewashing, which is required by prior art adhesive tapes. The basic data of the backing 1 and of the adhesive tape according to the present invention, and the shown parameters contained in the tables mentioned above are determined according to the following standards:

TABLE 4

| DIN Standards | New designation | Date of the currently valid version | |
|---|---|---|---|
| EN ISO 2286-2 | | 1998-07 | weight per unit area |
| DIN 53830-3 | | 1981-05 | determination of linear density of yarns |

TABLE 4-continued

| DIN Standards | New designation | Date of the currently valid version | |
|---|---|---|---|
| DIN EN 1049-2 | | 1994-02 | determination of threads per unit length |
| DIN EN 1942 | | 2008-06 | thickness |
| DIN EN 14410 | | 2003-06 | breaking strength/elongation |
| DIN EN 1939 | | 2003-12 | peel adhesion |
| DIN EN 1944 | | 1996-04 | unwinding force |
| DIN EN 21974 | DIN EN ISO 1974:2012-09 | 2012-09 | tear resistance |
| DIN EN ISO 9237 | | 1995-12 | permeability of fabrics to air |
| DIN 53 362 flagging | | 2003-10 | flexural strength according to LV 312, version: 2009/10 |
| LV 312 | LV 312-1 | 2009-10 | protection systems for cable harnesses in motor vehicles, adhesive tapes; test guideline |

The manual tearability was determined according to LV 312.

The abrasion test was carried out with an abrasion tester according to the joint test guideline of AUDI, BMW, DC and VW "Adhesive Tapes for Cable Sets in Motor Vehicles", LV 312, on a 5-mm mandrel, and included checks every 10 strokes. The final value was achieved as soon as the adhesive coating on the back side (adhesive coating 4) was abraded from the support 1.

The invention is not restricted to the exemplary embodiments, but also includes all equivalent embodiments within the scope of the invention. It is expressly pointed out that the exemplary embodiments are not restricted to all combined features, but each individual partial feature as such can also be fundamental to the present invention independently of all other partial features. As a person skilled in the art will readily appreciate, the above description is meant as an illustration of the principles of this invention. This description is not intended to limit the scope or application of this invention in that the invention is susceptible to modification, variation and change, without departing from spirit of this invention, as defined in the following claims.

What is claimed is:

1. A cable wrapping tape, comprising
a support (1) made of a textile fabric consisting of warp threads (2) and weft threads (3), the warp and weft threads (2, 3) being made of filament yarns made of PET plastic, the weft threads (3) being larger than the size of the warp threads (2), and
an adhesive layer (4) applied to the support (1),
wherein the size of the warp threads (2) is at least 20 dtex and at most 40 dtex,
wherein the size of the weft threads (3) is between 155 dtex and 200 dtex,
wherein the warp threads (2) have a thread count of at least 20 per cm and at most 30 per cm and a filament count in a range from 24 through 96 per warp thread (2),
wherein the weft threads (3) have a thread count of at least 28 per cm and at most 40 per cm and a filament count in a range from 24 through 36 filaments per weft thread (3),
wherein the grammage of the support (1) is at least 40 g/m$^2$ and at most 100 g/m$^2$, wherein the coated adhesion tape has a thickness of at least 0.08 mm and at most 0.12 mm, wherein the warp and weft thread are spun dyed, and
wherein the support has a tear resistance in a range of 2500 mN through 8000 mN, measured according to DIN EN ISO 1974:2012-09.

2. The cable wrapping tape according to claim 1, wherein the adhesive layer (4) is made of an acrylate adhesive or of synthetic rubber.

3. The cable wrapping tape according to claim 1, wherein the grammage of the support (1) is between 80 g/m$^2$ and 100 g/m$^2$.

4. The cable wrapping tape according to claim 1, wherein the warp threads and the weft threads are selected from the group consisting of pre-oriented yarns, fully drawn yarns, and draw-textured yarns.

* * * * *